US012694099B2

(12) United States Patent
Bu et al.

(10) Patent No.: US 12,694,099 B2

(45) Date of Patent: *Jul. 28, 2026

---

(54) GENERATING MITIGATING RESPONSES TO SECURITY DEFICIENCIES USING GENERATIVE MACHINE LEARNING MODELS

(71) Applicant: Cisco Technology, Inc., San Jose, CA (US)

(72) Inventors: Tian Bu, Basking Ridge, NJ (US); Girish Pulprayil Chandranmenon, Edison, NJ (US); Jerry Wayne Gamblin, Holts Summit, MO (US)

(73) Assignee: Cisco Technology, Inc., San Jose, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/607,318

(22) Filed: Mar. 15, 2024

(65) Prior Publication Data

US 2025/0291898 A1 Sep. 18, 2025

(51) Int. Cl.
*G06F 21/55* (2013.01)
*G06F 21/57* (2013.01)
(52) U.S. Cl.
CPC ............ *G06F 21/55* (2013.01); *G06F 21/577* (2013.01)
(58) Field of Classification Search
CPC ............................... G06F 21/55; G06F 21/577
See application file for complete search history.

(56) References Cited

U.S. PATENT DOCUMENTS

| | | | |
|---|---|---|---|
| 12,095,786 B1 | 9/2024 | Arbel et al. | |
| 12,412,141 B2 * | 9/2025 | Wuest | G06F 21/554 |
| 2022/0083667 A1 | 3/2022 | Anwar et al. | |
| 2022/0286475 A1 | 9/2022 | Mullaney | |
| 2023/0026385 A1 * | 1/2023 | Zhang | G06F 21/577 |

(Continued)

OTHER PUBLICATIONS

Chen B., et al., "Unleashing the Potential of Prompt Engineering in Large Language Models: A Comprehensive Review", arxiv.org, Cornell University Library, 201 OLIN Library Cornell University Ithaca, NY 14853, arXiv:2310.14735 [cs.CL], Oct. 23, 2023, 13 Pages, XP091642874, Chapters 2.3, 2.6.

(Continued)

*Primary Examiner* — Pramila Parthasarathy

(74) *Attorney, Agent, or Firm* — Lee & Hayes, P.C.

(57) ABSTRACT

An example method includes receiving an identifier associated with a security deficiency, wherein the security deficiency is associated with a computer system; determining, based on the identifier, text data associated with the identifier; determining a text prompt, wherein the text prompt comprises an instruction segment and the text data, and wherein the instruction segment identifies a mitigating response detection task and an output constraint; providing the text prompt to a generative machine learning model; receiving, from the generative machine learning model, a set of outputs including a first output identifying a first mitigating response and a second output identifying a second mitigating response; determining that the first output satisfies the output constraint; determining that the second output fails to satisfy the output constraint; determining, based on the first output, a final output; and providing the final output using an output interface.

20 Claims, 6 Drawing Sheets

(56)                    References Cited

U.S. PATENT DOCUMENTS

2023/0057593 A1    2/2023   Krishnamurthy et al.
2023/0177169 A1    6/2023   Bulut et al.
2023/0205891 A1    6/2023   Yellapragada et al.

OTHER PUBLICATIONS

Huang J., et al., "PenHeal: A Two-Stage LLM Framework for Automated Pentesting and Optimal Remediation", Proceedings of the 3rd ACM Sigplan International Workshop on Programming Abstractions and Interactive Notations, Tools, and Environments, ACMPUB27, New York, NY, USA, Nov. 7, 2024, pp. 11-22, XP059834014, DOI: 10.1145/3689933.3690831, ISBN: 979-8-4007-1234-0, chapter 4.3, figure -3.
International Search Report and Written Opinion for International Application No. PCT/US2025/018650, mailed May 16, 2025, 17 Pages.
Mcclanahan K., et al., "When ChatGPT Meets Vulnerability Management: The Good, the Bad, and the Ugly", 2024 International Conference on Computing, Networking and Communications (ICNC), IEEE, Feb. 19, 2024, pp. 664-670, XP034622719, DOI: 10.1109/ICNC59896.2024.10555953 [retrieved on Jun. 21, 2024], Chapters I-V, Table III.
White J., et al., "A Prompt Pattern Catalog to Enhance Prompt Engineering with ChatGPT", arxiv.org, Cornell University Library, 201 OLIN Library Cornell University Ithaca, NY 14853, arXiv:2302.11382v1 [cs.SE], Feb. 21, 2023, 19 Pages, XP091444160, Chapter III.

* cited by examiner

400

RECEIVE DEFICIENCY IDENTIFIER
402

RETRIEVE TEXT DATA
404

DETERMINE PROMPT
406

PROVIDE PROMPT TO GENERATIVE ML
MODEL
408

RECEIVE MODEL OUTPUT
410

OUTPUT VALIDATED?
412

No → DISCARD TEXT DATA
414

YES

DETERMINE MITIGATING RESPONSE BASED ON
THE TEXT DATA
416

GENERATING MITIGATING RESPONSES TO SECURITY DEFICIENCIES USING GENERATIVE MACHINE LEARNING MODELS

TECHNICAL FIELD

This present application pertains to the field of computer security and more specifically, to techniques for generating mitigating response to security deficiencies using generative machine learning models.

BACKGROUND

Extended detection and response (XDR) systems are an emerging technology for advanced threat detection and security incident response. XDR platforms integrate data from the entire information technology infrastructure of a computing system to provide unified visibility and automated actions against cyberattacks. A core challenge in XDR systems is automated and expediated response and/or remediation of security deficiencies.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
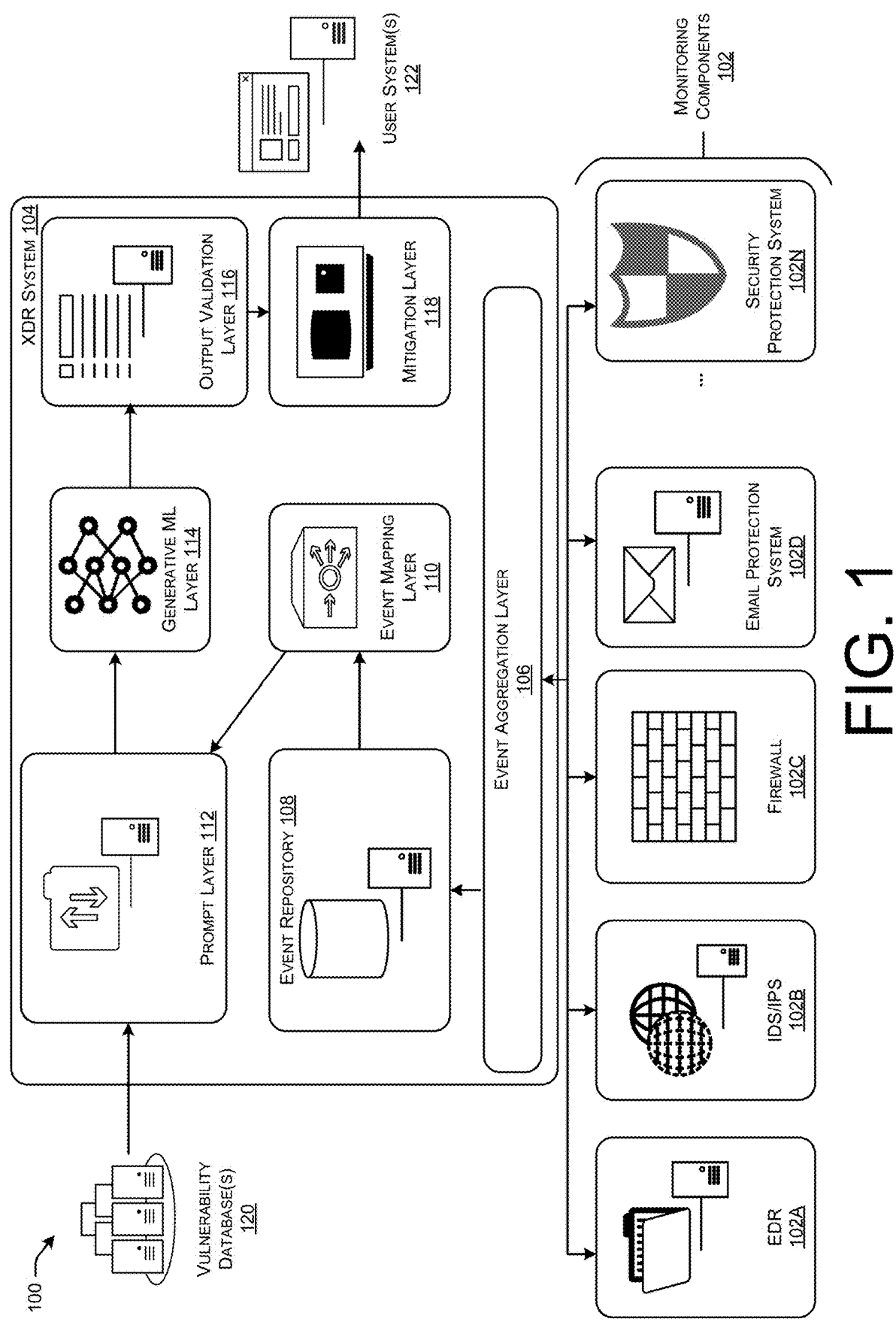
FIG. 1 depicts an example environment with an Extended Detection and Response (XDR) system that interacts with a set of monitoring components.

This disclosure describes for determining a mitigating response (e.g., a compensating control) for a security deficiency (e.g., a security vulnerability and/or exposure) using a generative machine learning model. In some cases, the techniques described herein relate to a method including receiving an identifier associated with a security deficiency, wherein the security deficiency is associated with a computer system. The method further includes determining, based on the identifier, text data associated with the identifier. The method further includes determining a text prompt, wherein the text prompt comprises an instruction segment and the text data, and wherein the instruction segment identifies a mitigating response detection task and an output constraint. The method further includes providing the text prompt to a generative machine learning model. The method further includes receiving, from the generative machine learning model, a set of outputs including a first output identifying a first mitigating response and a second output identifying a second mitigating response. The method further includes determining that the first output satisfies the output constraint. The method further includes determining that the second output fails to satisfy the output constraint. The method further includes determining, based on the first output, a final output. The method further includes and providing the final output using an output interface.

Additionally, the techniques described herein may be performed by a system and/or device having non-transitory computer-readable media storing computer-executable instructions that, when executed by one or more processors, performs the method described above.

Example Embodiments

This disclosure describes techniques for determining a mitigating response (e.g., a compensating control) for a security deficiency (e.g., a security vulnerability and/or exposure) using a generative machine learning model. A mitigating response may be a response to a security deficiency that reduces the risk level associated with the security deficiency without fixing the underlying problem and/or the root cause. For example, if a vulnerability allows remote code execution due to a buffer overflow flaw, a mitigating response may involve restricting access to the vulnerable system as a temporary containment measure before a patch is deployed. As another example, if a web application has an access control misconfiguration that allows unauthorized data access, a mitigating response may involve monitoring the application logs for signs of unauthorized access as a compensating control until the access rules can be properly fixed. As another example, if a software library with known vulnerabilities is used within an application, a mitigating response may include executing input validation and sanitization routines on the library.

In some cases, to determine a mitigating response associated with a security deficiency (e.g., a security deficiency corresponding to a monitoring event captured by a monitoring component that monitors a software component), an example system may perform the following operations: (i) identifying a deficiency identifier (e.g., a Common Vulnerabilities and Exposures (CVE) identifier) associated with the security deficiency, (ii) retrieving one or more texts (e.g., advisories, solutions, remediation scripts, remediation tools, product notifications, threat intelligence reports, and/or the like.) that correspond to the deficiency identifier, (iii) generating a prompt for a generative machine learning model to process the texts to detect a mitigating response, (iv) providing the prompt to the generative machine learning model, (v) receiving the output of the machine learning model, (vi) determine whether the output satisfies one or more output constraints (e.g., one or more output constraints specified by format and/or content requirements specified in the prompt), and (vii) if the output satisfies the output constraint(s), determine the mitigating response based on the validated output. In some cases, the output constraint is associated with inclusion of a mitigating response from a defined set of mitigating responses.

In some cases, the prompt is provided N times to the generative machine learning model to determine N output texts. The N output texts may then be processed in accordance with the output constraint(s) to determine M of those N output texts that satisfy the output constraint(s). After identifying the M validated output texts, the mitigating response associated with the security deficiency may be determined by combining the M validated output texts. In some cases, combining two or more output texts includes generating output data that includes the two or more mitigating responses (e.g., two or more compensating controls) specified in the two or more output texts. In some cases, combining M output texts includes: (i) extracting M mitigating responses (e.g., M compensating controls) specified in the M output texts, (ii) for each of the M mitigating responses, determine a score based on the extent to which the other M−1 mitigating responses confirm the mitigating responses, and (iii) determine the final mitigating response based on a subset of the M mitigating responses as selected in accordance with the M scores.

In some cases, a technical advantage of the techniques described herein is that they can detect the need for usage of new mitigating responses in response to new security deficiencies without requiring retraining on specific data associated with those new deficiencies. In some cases, a generative machine learning model is trained on volumes of unstructured text data rather than labeled training examples. When a previously unknown deficiency is uncovered, the generative machine learning model can analyze documents describing the specifics of the deficiency and determine mitigation strategies even if no such documents have been provided to the model during training. This provides faster response time when new security deficiencies and/or threats arise. In some cases, by leveraging knowledge gained from broad sources of text data, the model may be able to detect recommended responses even if examples directly related to a new security deficiency are absent from the training data. In any entity or organization, the ongoing evolution of threats, risks, technologies, and processes means that flexibility and adaptability are crucial security needs. In such a context, the automated detection and mitigation approaches described herein enable an organizational security policy that dynamically responds to emerging deficiencies.

FIG. 1 depicts an example environment 100 with an Extended Detection and Response (XDR) system 104 that interacts with a set of monitoring components 102, such as an EDR system 102A, an Intrusion Detection System (IDS)/Intrusion Prevention System (IPS) 102B, a firewall engine 102C, an email protection system 102D, and other security protection systems 102N. The monitoring components 102 may be configured to generate monitoring event(s) (e.g., monitoring events describing security deficiencies associated with a computer network) and provide the generated monitoring event(s) to the XDR system 104, as further described below. While various implementations of the techniques described herein are described as being performed by an XDR system, a person of ordinary skill in the relevant technology will recognize that the disclosed techniques may be implemented by other computer systems and/or other computer security frameworks as well. In some cases, the techniques are implemented by a system for processing CVE data and/or text data indexed based on CVE identifiers.

The EDR system 102A may monitor activity on endpoints such as servers, desktops, and laptops. The EDR system 102A may generate monitoring events for suspicious or malicious activity observed on endpoints. The EDR system 102A may be implemented as agent software installed on each endpoint. The agent software may operate in the background by continuously collecting endpoint telemetry data and sending it to a central management console and/or the XDR system 104. The EDR agent may employ various techniques to detect threats, such as signature-based detection, behavioral analysis, and machine learning algorithms. Signature-based detection may include comparing observed activities against known patterns of malicious behavior or attack signatures. Behavioral analysis may include identifying anomalies and/or deviations from normal endpoint behavior which might indicate a potential threat. Additionally, machine learning algorithms may enhance detection capabilities by learning from historical data and adapting to new and emerging threats.

The IDS/IPS 102B may monitor network activity by analyzing network traffic. The IDS/IPS 102B may generate monitoring events for anomalous network traffic and/or known attack patterns. To perform monitoring and detection operation, the IDS/IPS 102B may employ a combination of techniques, including signature-based detection, anomaly detection, and heuristic analysis. Signature-based detection may include comparing network traffic against a database of known attack patterns. Anomaly detection may include identifying deviations from normal network behavior, which could indicate possible intrusions and/or suspicious activities. Heuristic analysis may include applying predefined rules and behavioral models to detect threats. In some cases, the IDS/IPS 102B performs at least one of an IDS or an IPS functionality. The IDS functionality may identify suspicious or anomalous network behaviors, such as port scans, unusual data transfer patterns, and/or unauthorized access attempts. The IPS functionality may perform immediate action(s) to block or prevent identified threats from progressing further into the network. The IDS/IPS 102B may be implemented as a hardware or virtual network appliance deployed on the network. For example, the IDS/IPS 102B may be implemented as a hardware appliance installed at strategic points within the network infrastructure. Alternatively, the IDS/IPS 102B may be implemented as a virtual network appliance running on virtualized servers or cloud-based instances.

The firewall engine 102C may filter incoming and outgoing network traffic according to configured rules. The firewall engine 102C may generate monitoring events when traffic is blocked or allowed. In some cases, the firewall engine 102C operates as a barrier between an internal network and an external network by controlling the flow of network traffic based on predefined rules. In some cases, firewall engine 102C is configured to filter incoming and outgoing network traffic to enforce security policies and protect a network's assets from unauthorized access.

In some cases, when network packets are received at the firewall engine 102C, the received network packets are inspected against a set of predefined rules. These rules can be based on various criteria, such as source and destination IP addresses, port numbers, application protocols, or specific content within the packets. If a packet matches a rule for allowing network traffic, the firewall engine 102C may permit passage of the allowed packet through to the intended destination. On the other hand, if the packet matches a rule for denying network traffic, the firewall engine 102C may block passage of the packet to prevent unauthorized access and/or to prevent potentially malicious traffic from entering and/or leaving the network. The firewall engine 102C may be implemented as a hardware and/or virtual network appliance.

The email protection system 102D may scan incoming and outgoing emails for malware and spam. The email protection system 102D may generate monitoring events for blocked and/or allowed emails. The email protection system 102D may be implemented as a software service integrated with email servers. In some cases, the email protection system 102D continually evaluates the content, attachments, and/or sender reputation of incoming emails. To do so, the email protection system 102D may use databases of known threat patterns to identify and block emails that exhibit malicious behavior and/or contain harmful content. In some cases, the email protection system 102D processes outgoing emails to ensure that those outgoing emails do not inadvertently transmit sensitive information and/or include suspicious links and/or attachments. In some cases, whenever the email protection system 102D identifies a potentially malicious or spam email, the email protection system 102D generates one or more monitoring events to record the identification. These monitoring events can include details such as the sender's information, recipient details, timestamp, and/or a description of the threat and/or spam category.

Additional security protection systems 102N may perform other types of security monitoring and generate associated monitoring events. Examples of such additional security protection systems 102N include Web Application Firewalls (WAFs), Data Loss Prevention (DLP) systems, Network Access Control (NAC) systems, threat intelligence platforms, advanced threat detection systems, Security Information and Event Management (SIEM) systems, vulnerability management systems, and Endpoint Protection Platforms (EPPs).

As depicted in FIG. 1, an event aggregation layer 106 receives the monitoring events generated by the monitoring components 102 and stores those events on an event repository 108. The event repository 108 may be a storage framework for collecting, storing, and/or analyzing the monitoring events generated by the various monitoring components 102. The event repository 108 may receive the monitoring events in real-time from the monitoring components 102 and the received events in a structured and/or semi-structured format for efficient retrieval and/or analysis.

The event repository 108 may be implemented using a database, data warehouse, and/or cloud storage. If implemented as a database, the event repository 108 may utilize NoSQL databases like Apache Cassandra or MongoDB to provide horizontal scaling capabilities to handle large volumes of data. If implemented as a data warehouse, the event repository 108 may use solutions like Amazon Redshift or Google BigQuery to enable complex analytics and/or reporting on historical data. If implemented as a cloud storage solution, the event repository 108 may use cloud-based object storage services like Amazon S3 or Microsoft Azure Blob Storage.

The event aggregation layer 106 may, for example, receive the monitoring events in real-time from the monitoring components 102, transform the monitoring events into a unified format, and/or store the monitoring events and/or reformatted monitoring events in the event repository 108. The event aggregation layer 106 may store data determined based on the monitoring events using a structured and/or a semi-structured format. The event repository 108 may, in some cases, be configured to receive and store the monitoring events generated by the monitoring components 102.

As further depicted in FIG. 1, the XDR system 104 includes an event mapping layer 110. The event mapping layer 110 may be configured to retrieve monitoring event(s) from the event repository 108 and map the retrieved monitoring event(s) to security deficiency identifier(s). For example, the event mapping layer 110 may be configured to retrieve a monitoring event stored on the event repository 108, determine a security deficiency (e.g., security vulnerability and/or exposure) associated with the retrieved event, and map the security deficiency to a deficiency identifier.

An example of a security deficiency identifier is an identifier associated with a security deficiency library, such as a Common Vulnerabilities and Exposures (CVE) identifier. CVE is a library of publicly disclosed computer security vulnerabilities and exposures. A CVE entry may include a description of a security vulnerability or exposure, vendors affected by the vulnerability or exposure, the type and/or category of the vulnerability or exposure (e.g., a common weakness enumeration (CWE) for the vulnerability or exposure), the severity of the vulnerability or exposure, and/or the like.

In some cases, the event mapping layer 110 maps a monitoring event retrieved from the event repository 108 to a corresponding CVE identifier. This may enable the XDR system 104 to categorize the monitoring event(s) using a standardized system and/or retrieve other guidance data (e.g., advisories, solutions, tools, remediation scripts, remediation tools, product notifications, threat intelligence reports, and/or the like) associated with the CVE identifier.

For example, the event mapping layer 110 may determine that a retrieved monitoring event indicates an Azure stack spoofing vulnerability. The event mapping layer 110 may map this monitoring event to CVE-2019-1234, which is a CVE identifier representing a specific Azure stack spoofing vulnerability. This may enable the XDR system 104 to retrieve guidance data associated with the specific Azure stack spoofing vulnerability to facilitate further analysis.

As another example, the event mapping layer 110 may determine that a retrieved monitoring event indicates a cross-site scripting vulnerability in GROWI v3.8.1. The event mapping layer 110 may map this monitoring event to CVE-2021-5678, which is a CVE identifier representing a cross-site scripting vulnerability in GROWI v3.8.1. This may enable the XDR system 104 to retrieve guidance data associated with the cross-site scripting vulnerability in GROWI v3.8.1 to facilitate further analysis.

As another example, the event mapping layer 110 may determine that a retrieved monitoring event indicates butter underflow in ssldump 0.9b2. The event mapping layer 110 may map this monitoring event to CVE-2021-5678, which is a CVE identifier representing a butter underflow in ssldump 0.9b2 that causes a denial service. This may enable the XDR system 104 to retrieve guidance data associated with the butter underflow in ssldump 0.9b2 to facilitate further analysis.

In some cases, to determine the deficiency identifier associated with a monitoring event, the event mapping layer 110 may process the monitoring event details to identify indicators of compromise (IOCs). For example, the event mapping layer 110 may scan the monitoring event data for specific attack patterns, malicious file hashes, domain names, IP addresses, and/or the like. The event mapping layer 110 may then cross-reference these IOCs against a database cataloging which IOCs correspond to which deficiency identifiers. If a match is found, the event mapping layer 110 may map the monitoring event to the associated deficiency identifier. In some cases, to determine the deficiency identifier associated with a monitoring event, the event mapping layer 110 may process the textual description and/or log data associated with the monitoring event using a machine learning model, such as a natural language processing model used for event classification. In some cases, to determine the deficiency identifier associated with a monitoring event, the event mapping layer 110 may process feature data (e.g., impacted assets, impacted software versions, network connections, contextual data, and/or the like) associated with the monitoring event using a machine learning model, such as a classification machine learning model.

As further depicted in FIG. 1, the XDR system 104 includes a prompt layer 112 that generates a prompt based on querying text data (e.g., guidance data) associated with a security deficiency identifier (e.g., CVE identifier) from one or more vulnerability databases 120 (e.g., a CVE database, an advisory database, a solution database, a guidance database, and/or the like). The prompt layer 112 may receive text data from the vulnerability databases 120 and generate a text prompt for inputting to the generative machine learning model based on the text data.

Examples text data associated with a security deficiency identifier include advisories, solutions, remediation scripts, remediation tools, product notifications, threat intelligence reports, and/or the like. Such text data may provide additional details about a security deficiency, such as a description of the deficiency, the potential impact of the security deficiency, the systems, components, products, and/or software versions affected by the security deficiency, severity ratings associated with the deficiency, mitigating solutions (e.g., compensating controls) for containing the effects of the security deficiency, remediation strategies (e.g., remediation scripts and/or tools, such as executable files, scripts, utilities, and/or patches) for eliminating the effect of the deficiency (e.g., to fix the deficiency), and/or the like. In some cases, the text data represents one or more available patches, upgrades, and/or workarounds for addressing a security deficiency associated with a software product (e.g., a specific software version).

In some cases, the text data associated with a security deficiency may identify one or more mitigating responses (e.g., compensating controls) and/or remediation strategies for addressing the security deficiency. A mitigating response may be contrasted with a remediation strategy associated with the security deficiency in that a mitigating response aims to reduce risk exposure associated with the deficiency while an elimination strategy aims to eliminate the root cause of the security deficiency. For example, if a vulnerability allows remote code execution due to a buffer overflow flaw, a remediation strategy may involve patching the software to address the overflow. In contrast, a mitigating response may involve restricting access to the vulnerable system as a temporary containment measure before a patch is deployed. As another example, if a web application has an access control misconfiguration that allows unauthorized data access, a remediation strategy may involve correcting the access control rules to restrict access as intended. In contrast, a mitigating response may involve monitoring the application logs for signs of unauthorized access as a compensating control until the access rules can be properly fixed. As another example, if a software library with known vulnerabilities is used within an application, a remediation strategy may involve upgrading or replacing the library. In contrast, a mitigating response may include executing input validation and sanitization routines on the library.

As further depicted in FIG. 1, the XDR system 104 includes a generative machine learning layer 114 that is configured to process the text prompt generated by the prompt layer 112 using a generative machine learning model to determine a mitigating strategy associated with the corresponding security deficiency based on the text data. The generative machine learning layer 114 may: provide the text prompt to the generative machine learning model, and in response, receive the output of the generative machine learning model. The text prompt may include the text data, an instruction segment with instructions to the generative machine learning model about the content to be extracted from the text data and/or the format of the extracted content, description data and/or log data associated with the monitoring event that triggered the text data extraction, and/or the like. In some cases, the text prompt defines one or more constraints for the output of the generative machine learning model. These output constraints may then be used by the output validation layer 116 to determine whether the output of the generative machine learning model is determined to be accurate and/or reliable.

As described above, the prompt layer 112 may generate text prompt for a generative machine learning model that is configured to determine a mitigating strategy described in particular text data. The text prompt may identify the mitigating response detection task (e.g., may identify that the generative model should detect one or more mitigating responses based on the text data) and provide one or more output constraints for the output of the generative machine learning model. For example, the text prompt may require that the output of the generative machine learning model is in a specific structured format, such as in a structured JavaScript Object Notation (JSON) format.

For example, the text prompt generated by the prompt layer 112 may include the following text segment: "Given the following Common Vulnerabilities and Exposures (CVE) text, please identify and describe the compensating control mentioned within it. Present the output using the following format: "CVE_text": {"CVE_ID": "[CVE ID here]", "Description": "[Description of the CVE vulnerability]", "Compensating_Control": "[Description of the compensating control]"}." In this example, the text prompt defines output constraint(s) corresponding to the specified output structure. For example, the text prompt may define the following output constraint(s): that the output should start with CVE_ID":, include first text data that satisfy a regular expression condition corresponding to a CVE ID after "CVE_ID":, include ""Description":" after the first text data, include text data after "Description":, include second text data after "Description": include "Compensating control":, and include third text data after "Compensating control":.

As another example, the text prompt generated by the prompt layer 112 may include the following text segment: "Please identify the compensating control and affected software from this CVE summary. Present the output using the following format: "CVE_text": {"CVE_ID": "[CVE ID here]", "Description": "[Description of the CVE vulnerability]", "Compensating_Control": "[Description of the compensating control]", "Affected_Software": "[Name and version of affected software]", "Severity": "[CVSS severity rating]"}." As another example, the text prompt generated by the generative machine learning layer 114 may include the following text segment: "Please extract the compensating control, affected product, and severity rating from this CVE summary. Present the output using the following format: "CVE_text": {"CVE_ID": "[CVE ID here]", "Description": "[Description of the CVE vulnerability]", "Compensating_Control": "[Description of the compensating control]", "Affected_Product": "[Name and version of affected product]", "Severity": "[CVSS severity rating]"}." In these examples, in addition to specific formatting and the compensating control, the text prompt requires providing other data fields that may be used to evaluate the accuracy and/or relevance of the corresponding output. For example, the output may be evaluated based on whether the output outputs the CVE text itself.

The generative machine learning layer 114 may process the text prompt corresponding to particular text data using a generative machine learning model, such as a large language model, to determine output data and provide the output data to the output validation layer 116. The generative machine learning model may be a model that is configured to generate natural language text reflecting a semantic understanding of input text data as guided by instruction(s) described in the text prompt. For example, the generative machine learning model may use an attention-based encoder to generate an encoded representation of the input text prompt and a decoder to process the encoded representation to generate the output text. The generative machine learning model may be trained using an auto-regressive approach, for example using techniques such as missing word prediction or next word prediction. In some cases, the generative machine learning model is trained and/or fine-tuned in a supervised manner. For example, the generative machine learning model may be fine-tuned on a dataset of text labelled with structured annotations reflecting mitigating responses. In some cases, the generative machine learning model is fine-tuned using Reinforcement learning from Human Feedback (RLHF), for example using a reward model that is trained to predict human feedback based on the output of the generative machine learning model.

After the generative machine learning layer 114 processes the text prompt using a generative machine learning model to determine text data, the generative machine learning layer 114 provides the text data to an output validation layer 116. The output validation layer 116 may be configured to process the output data based on one or more output constraints to determine whether the output data satisfies the output constraint(s). As described above, the output constraint(s) may be determined based on instructions, formatting requirements, and/or requested data fields provided in the text prompt. For example, consider a prompt that includes the text segment "Given the following Common Vulnerabilities and Exposures (CVE) text, please identify and describe the compensating control mentioned within it. Present the output using the following format: "CVE_text": {"CVE_ID": "[CVE ID here]", "Description": "[Description of the CVE vulnerability]", "Compensating_Control": "[Description of the compensating control]"}." Given this prompt, the output validation layer 116 may determine whether the corresponding output text satisfies the following output constraints: that output should start with CVE_ID":, include first text data that satisfy a regular expression condition corresponding to a CVE ID after "CVE_ID":, include ""Description":" after the first text data, include text data after "Description":, include second text data after "Description": include "Compensating control":, and include third text data after "Compensating control":.

As another example, consider a prompt that includes the text segment "Please identify the compensating control and affected software from this CVE summary. Present the output using the following format: "CVE_text": {"CVE_ID": "[CVE ID here]", "Description": "[Description of the CVE vulnerability]", "Compensating_Control": "[Description of the compensating control]", "Affected_Software": "[Name and version of affected software]", "Severity": "[CVSS severity rating]"}." In this example, the output validation layer 116 may evaluate a corresponding output text based on whether it follows the specified structure (e.g., text structure) and/or includes a CVE identifier, a description of the CVE vulnerability, the description of the compensating control, a name and version of the affected software, and a severity rating (e.g., Common Vulnerability Scoring System (CVSS) severity score).

In some cases, in addition to instructions, required data fields, and/or required formatting requirements specified in the text prompt, the output validation layer 116 may use data external to the text prompt (e.g., data retrieved from one or more databases). For example, consider the text prompt that includes "Please extract the compensating control, affected product, and severity rating from this CVE summary. Present the output using the following format: "CVE_text": {"CVE_ID": "[CVE ID here]", "Description": "[Description of the CVE vulnerability]", "Compensating_Control": "[Description of the compensating control]", "Affected_Product": "[Name and version of affected product]", "Severity": "[CVSS severity rating]"}." In this example, in addition to evaluating a corresponding output based on whether the output corresponds to the specified format and includes the specified fields, the output validation layer 116 may determine whether the CVE identifier specified in the output text is a CVE identifier that matches one of the CVE identifiers from a list of defined CVE identifiers. As another example, the output validation layer 116 may determine whether the affected product identifier matches a product identifier determined by performing entity extraction (e.g., named entity extraction) on the text prompt (e.g., on the text data included in the text prompt).

In some cases, to determine whether an output text generated in response to a text prompt is accurate and/or reliable, the output validation layer 116 determines: (i) whether the output text matches the structure and/or formatting required in the text prompt, (ii) whether a field specified by the output text matches a list of available values for that field, and/or (iii) whether a field value specified by the output text matches a value determined by performing entity extraction on the text prompt. In some cases, the output constraints may include constraints that do not depend on the requirements specified in the text prompt and/or whether values specified in the output constraint match ground-truth values. For example, an output constraint may depend on word count. In some cases, the output validation layer 116 may determine whether an output text generated in response to a text prompt is accurate and/or reliable based on whether the word count associated with the output text satisfies a threshold. As another example, an output constraint may depend on whether the output text contains specific keywords or phrases that indicate the presence of a compensating control. For instance, the output validation layer 116 may check whether the "Compensating_Control" field in the output contains known control phrases like "input validation", "parameterization", "whitelisting", etc.

The output validation layer 116 may then process the output data from the generative machine learning layer 114 to verify that the output satisfies the output constraint(s) defined in the input data. For example, the output validation layer 116 may check that the output data starts with "CVE_text": {and ends with}; validate (e.g., via a regular expression) that the "CVE_ID" field contains a properly formatted CVE ID; determine whether the "Description", "Compensating_Control", and any other requested fields are present and contain text; and/or determine whether optional fields like "Severity" match expected rating formats. In some cases, the output validation layer 116 may perform logical consistency checks. For example, the output validation layer 116 may use a classification machine learning model to evaluate whether the compensating control described in an output text has the semantic content corresponding to a proper compensating control and validate the output text only if the output of the classification machine learning model indicates that the described compensating control has the semantic content corresponding to a proper compensating control. As another example, the output validation layer 116 may use a classification machine learning model to determine a predicted severity rating for a text prompt and validate the corresponding output text only if the output of the classification machine learning model indicates that the severity rating provided in the text prompt matches and/or is within a threshold deviation of the predicted severity rating. The output validation layer 116 may also check output compliance of the output text with additional prompt constraints not related to content accuracy. For example, the output validation layer 116 may validate sentence length, formatting consistency, writing tone, and/or other style requirements specified in the text prompt.

In some cases, after the output validation layer 116 validates an output text, the output validation layer 116 provides the output text to the mitigation layer 118. The mitigation layer 118 may determine a mitigation strategy based on the validated output text. For example, the mitigation layer 118 may extract (e.g., based on the structure of the output text specified in the text prompt) the mitigating response specified in the output text (e.g., the value corresponding to the Compensating_Control field as specified by the input structure) and provide the mitigating response to a user system 122 using an output interface (e.g., a user interface platform or an application programming interface (API). In some cases, in addition to providing the mitigating response to the user system 122, the mitigation layer 118 may automatically execute operations corresponding to the mitigating response. For example, the mitigation layer 118 may automatically install and execute a monitoring software, a firewall software, or an intrusion detection software on the monitored computer system.

In some cases, after determining a set of validated output texts, the mitigation layer 118 combines those validated outputs to generate a final output identifying one or more mitigating responses. For example, in some cases, the mitigation layer 118 includes the combination of the validated outputs as part of a prompt that requests identifying a mitigating response based on the combination. In some cases, the prompt with the combination is provided to the generative machine learning model, and the output of the generative machine learning model is used to determine a final output identifying one or more mitigating responses.

In some cases, the mitigation layer 118 may combine two or more output texts to determine a mitigating response that is provided using the output interface and/or that is executed by the mitigation layer 118. For example, in some cases, the generative machine learning layer 114 provides a generated text prompt to the generative machine learning model N times to generate N corresponding output prompts. Afterward, the output validation layer 116 may validate M of those output prompts, where M<N. Subsequently, if M>=2, the mitigation may combine M output texts to determine a mitigating response that is provided using the output interface and/or that is executed by the mitigation layer 118. In some cases, combining two or more output texts includes generating output data that includes the two or more mitigating responses (e.g., two or more compensating controls) specified in the two or more output texts.

In some cases, combining M output texts includes: (i) extracting M mitigating responses (e.g., M compensating controls) specified in the M output texts, (ii) for each of the M mitigating responses, determine a voting score based on the extent to which the other M−1 mitigating responses confirm the mitigating responses, and (iii) determine the final mitigating response based on a subset of the M mitigating responses as selected in accordance with the M voting scores (e.g., provide R mitigating responses having the top R voting scores, where R may be a hyperparameter of the mitigation layer 118; provide those mitigating responses whose voting scores exceed a threshold T, where T may be a hyperparameter of the mitigation layer 118; and/or the like).

In some cases, the voting score associated with an mth validated output text from M validated output texts is determined based on the output of $$\sum\nolimits_{i=1}^{M-1} S(i, m),$$

where S(i,m) is a measure of how much the mitigating response described by an ith one of the remaining M−1 validated output scores confirms the mitigating response described by the mth validated output text. S(i,m) may, for example, be determined by processing the mitigating response described by the ith validated output text and the mitigating response described by the mth validated output text using a machine learning model (e.g., using a similarity determination machine learning model). In some cases, S(i,m) may be set to a non-zero value (e.g., one) if the mitigating response described by the ith validated output text and the mitigating response described by the mth validated output text are determined to be equivalent and/or sufficiently similar. For example, S(i,m) may be set to a non-zero value (e.g., one) if the similarity score associated with the mitigating response described by the ith validated output text and the mitigating response described by the mth validated output text exceeds a threshold. The similarity score may, for example, be determined using a similarity determination machine learning model.

Figure 2:
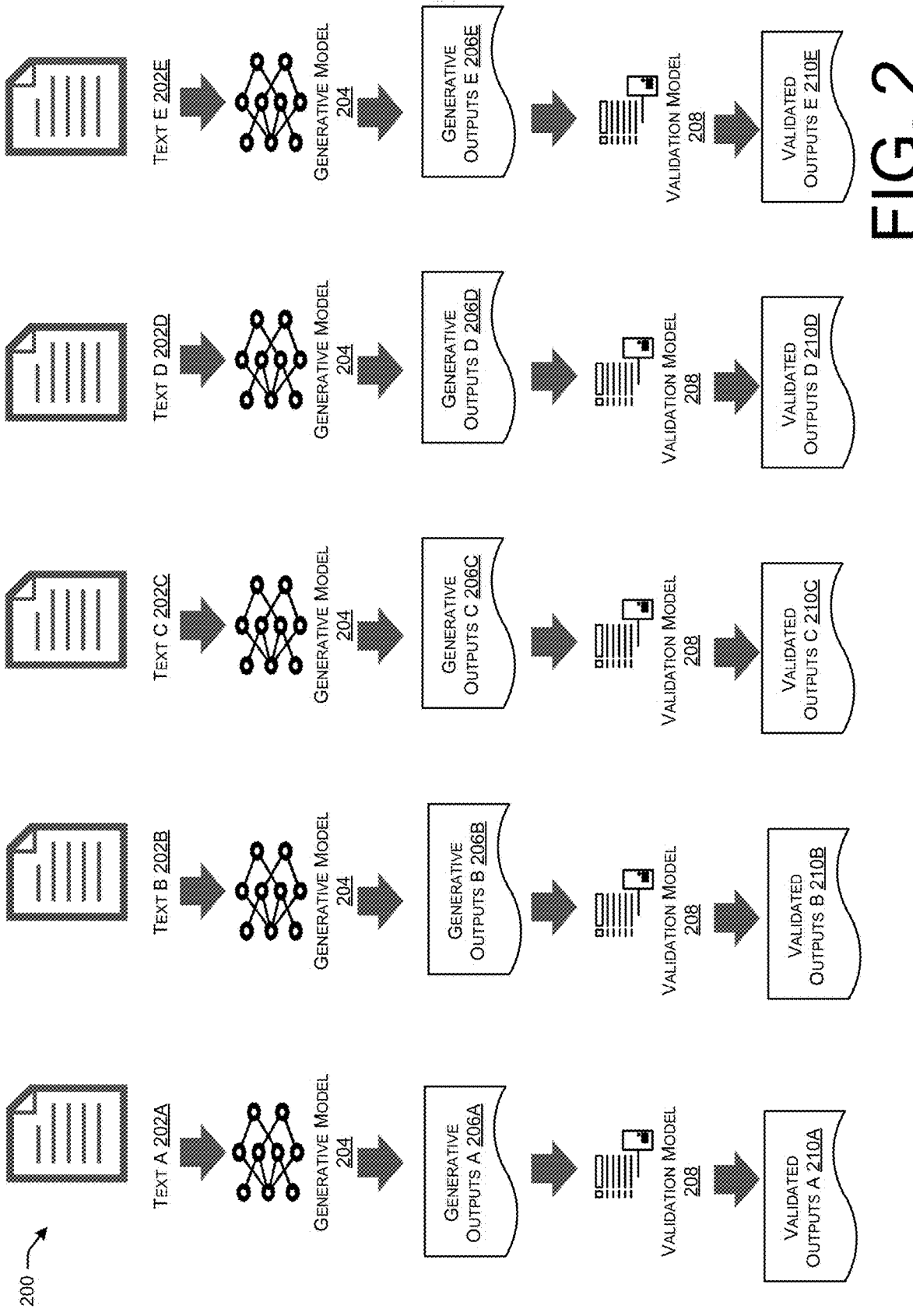
FIG. 2 provides an operational example of a process generating and validating mitigating responses.

FIG. 2 provides an operational example of a process 200 generating and validating five mitigating responses. As depicted in FIG. 2, the process 200 includes processing five texts using the generative machine learning model 204: text A 202A, text B 202B, text C 202C, text D 202D, and text E 202E. The five texts may include advisories, solutions, remediation scripts, remediation tools, product notifications, threat intelligence reports, and/or the like. The generative machine learning model may be a model that is configured to generate natural language text reflecting a semantic understanding of input text data as guided by instruction(s) described in the text prompt. To process the five texts, the generative machine learning model 204 processes five text prompts, each text prompt associated with a respective one of the five texts. In some cases, the text prompt associated with a respective text includes at least a portion of (e.g., all of) the input text, an instruction segment that describes that the generative machine learning model should perform a mitigating response detection task (e.g., a compensating control detection task), and one or more output constraints for the output of the machine learning model.

As further depicted in FIG. 2, the generative machine learning model 204 generates five output texts via processing the five texts. Specifically, the generative machine learning model 204 processes text A 202A (e.g., a text prompt associated with the text A 202A) M_A times to generate a set of M_A generative output texts 206A, processes text B 202B (e.g., a text prompt associated with the text B 202B) $M_B$ times to generate a set of $M_B$ generative output texts 206B, processes text C 202C (e.g., a text prompt associated with the text C 202C) $M_C$ times to generate a set of $M_C$ generative output texts 206C, processes text D 202D (e.g., a text prompt associated with the text D 202D) $M_D$ times to generate a set of $M_D$ generative output texts 206D, and processes text E 202E (e.g., a text prompt associated with the text E 202E) $M_E$ times to generate a set of $M_E$ generative output texts 206E. At least a subset of the five output texts may describe mitigating responses (e.g., compensating controls) represented in the respective input texts. The $M_i$ values may be the same or may be different across different texts (e.g., different prompts may be provided different numbers of times).

As further depicted in FIG. 2, a validation model 208 processes the five sets of generative output texts to determine five corresponding sets of validated output texts. Specifically, the validation model 208 processes the set of $M_A$ generative output texts 206A to determine a validated subset including a group of $N_A$ validated output texts 210A (where $N_A <= M_A$), processes the set of $M_B$ generative output texts 206B to determine a validated subset including a group of $N_B$ validated output texts 210B (where $N_B <= M_B$), processes the set of $M_C$ generative output texts 206C to determine a validated subset including a group of $N_C$ validated output texts 210C (where $N_C <= M_C$), processes the set of $M_D$ generative output texts 206D to determine a validated subset including a group of $N_D$ validated output texts 210D (where $N_D <= M_D$), and processes the set of $M_E$ generative output texts 206E to determine a validated subset including a group of $N_E$ validated output texts 210E (where $N_E <= M_E$). Validating a generative output text may include determining whether the output text satisfies one or more output constraints (e.g., one or more output constraints defined based on instructions and/or requirements specified in the text prompt to the generative machine learning model 204, one or more output constraints defined based on data and/or requirements that are external to the text prompt, and/or the like). In some cases, the output constraints evaluated by the validation model 208 include an output constraint about whether a generative output includes text data and/or text data having a threshold-satisfying length (e.g., word count) in a location in the output that is determined based on the structure specified in the text prompt (as a value following the "Compensating_Control": segment of the output text).

For example, in some cases, after determining a set of validated output texts, the system combines those validated outputs to generate a final output identifying one or more mitigating responses. In some cases, the system includes the combination of outputs as part of a prompt that requests identifying a mitigating response based on the combination. This prompt may itself include one or more output constraints. In some cases, the prompt with the combination is provided to the generative machine learning model, and the output of the generative machine learning model is used to determine a final output identifying one or more mitigating responses.

Figure 3:
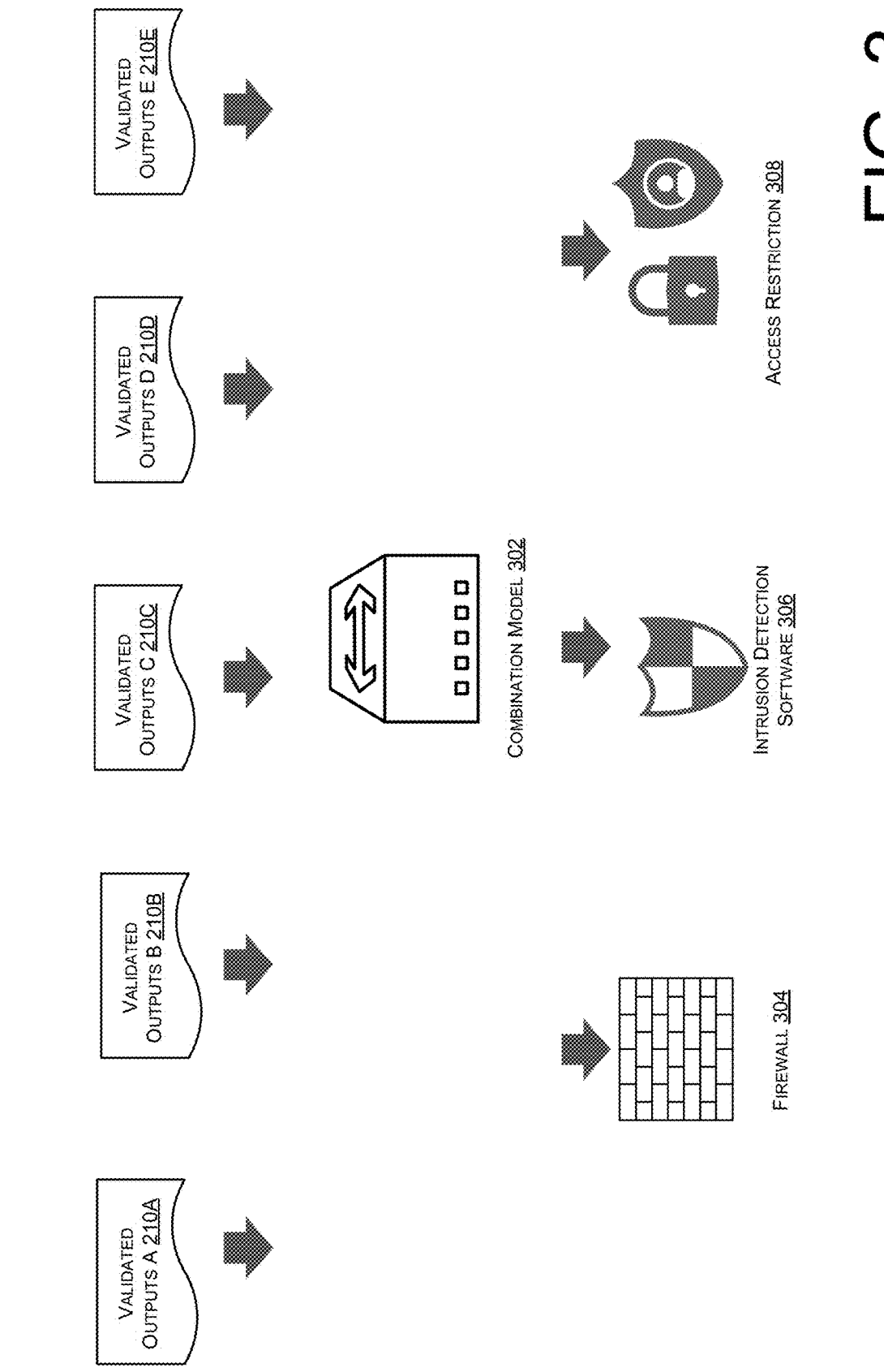
FIG. 3 provides an operational example of an example process for determining a mitigating response based on a set of validated generative output texts.

FIG. 3 provides an operational example of an example process 300 for determining a mitigating response based on five groups of validated generative output texts. Specifically, the five groups of generative outputs include the five output texts validated in accordance with the process 200 of FIG. 3: the group of $N_A$ validated output texts 210A, the group of $N_B$ validated output texts 210B, the group of $N_C$ validated output texts 210C, the group of $N_D$ validated output texts 210D, and the group of $N_E$ validated output texts 210E. As depicted in FIG. 3, a combination model 302 combines the five groups of validated generative output texts to determine a mitigating response. For example, the mitigating response may represent all three of the responses identified in the three validated output texts. For example, as depicted in FIG. 3, the three mitigating responses includes deploying a firewall software 304, deploying a intrusion detection system 306, or performing an access restriction operation 308 to restrict access to a monitored computer system.

Figure 4:
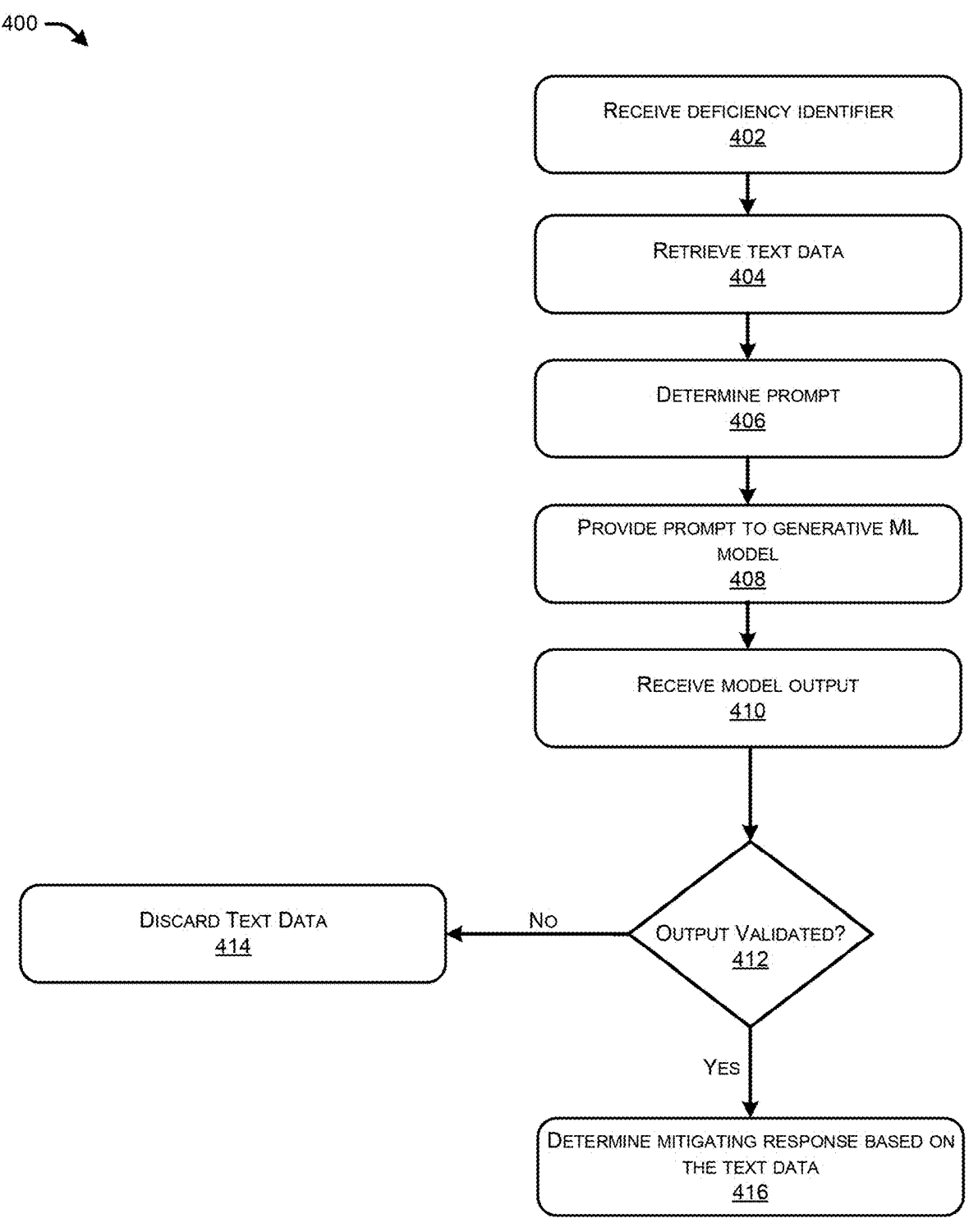
FIG. 4 is a flowchart diagram of an example process for determining a mitigating response based on a security deficiency identifier associated with a monitoring event.

FIG. 4 is a flowchart diagram of an example process 400 for determining a mitigating response based on a security deficiency identifier associated with a monitoring event. As depicted in FIG. 4, at operation 402, an example system (e.g., the XDR system 104 of FIG. 4) receives the security deficiency identifier. The security deficiency identifier may be an identifier of a security deficiency (e.g., a security vulnerability and/or exposure) associated with the monitoring event. An example of a security deficiency identifier is a CVE identifier.

At operation 404, the system retrieves text data associated with the security deficiency identifier. Examples text data associated with a security deficiency identifier include advisories, solutions, remediation scripts, remediation tools, product notifications, threat intelligence reports, and/or the like. Such text data may provide additional details about a security deficiency, such as a description of the deficiency, the potential impact of the security deficiency, the systems, components, products, and/or software versions affected by the security deficiency, severity ratings associated with the deficiency, mitigating solutions (e.g., compensating controls) for containing the effects of the security deficiency, remediation strategies (e.g., remediation scripts and/or tools, such as executable files, scripts, utilities, and/or patches) for eliminating the effect of the deficiency (e.g., to fix the deficiency), and/or the like.

At operation 406, the system determines a text prompt based on the text data. The text prompt may include at least a portion of the retrieved text data, an instruction segment that describes that the generative machine learning model should perform a mitigating response detection task (e.g., a compensating control detection task), and one or more output constraints for the output of the machine learning model. The output constraints may specify a required structure, format, and/or content associated with the output texts generated based on the text prompt.

At operation 408, the system provides the text prompt to a generative machine learning model. In some cases, the generative machine learning model may use an attention-based encoder to generate an encoded representation of the input text prompt and a decoder to process the encoded representation to generate the output text. The generative machine learning model may be trained using an auto-regressive manner, for example using techniques such as missing word prediction or next word prediction. In some cases, the system provides the text prompt to the generative machine learning model N times.

At operation 410, the system receives, in response to the text prompt, a generative output text from the generative machine learning model. The generative output text may be the output of processing the text prompt by the generative machine learning model. The generative output text may describe a mitigating strategy (e.g., a compensating control) described by the text prompt. In some cases, if the system provides the text prompt to the generative machine learning model N times, the generative machine learning model generates N output texts.

At operation 412, the system determines whether the generative output satisfies the output constraint satisfies an output constraint associated with the text prompt. The output constraint may be based on one or more requirements (e.g., one or more content requirements and/or one or more formatting requirements), such as one or more requirements specified in the text prompt. In some cases, an output constraint is associated with whether the output text includes one or more values (e.g., one or more version number values, one or more IP address values, and/or the likes) provided in the text prompt. In some cases, if the system provides the text prompt to the generative machine learning model N times to generate N output texts, the system performs operation 412 N times to determine a subset of the N output texts that satisfy the same set of output constraints.

If the system determines that the generative output fails to satisfy the output constraint associated with the text prompt (operation 412—No), the system proceeds to operation 414 to discard the text data. In some cases, if the system provides the text prompt to the generative machine learning model N times to generate N output texts, the system discards any of the N output texts that do not satisfy the output constraints.

If the system determines that the generative output satisfies the output constraint satisfies an output constraint associated with the text prompt (operation 412—Yes), the system proceeds to operation 416 to determine a mitigating response based on the text data. In some cases, the system provides the text prompt to the generative machine learning model N times to generate N output texts, the system proceeds to operation 416 if any of the N output texts satisfy the output constraint(s). The system may, for example, determine the mitigating response by combining (e.g., aggregating, performing a voting-based selection based on, and/or the like) the subset of the N output texts satisfy the output constraint(s).

Figure 5:
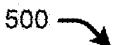
FIG. 5 is a flowchart diagram of an example process for determining and displaying a mitigating response based on a set of validated output texts.
Figure 5:
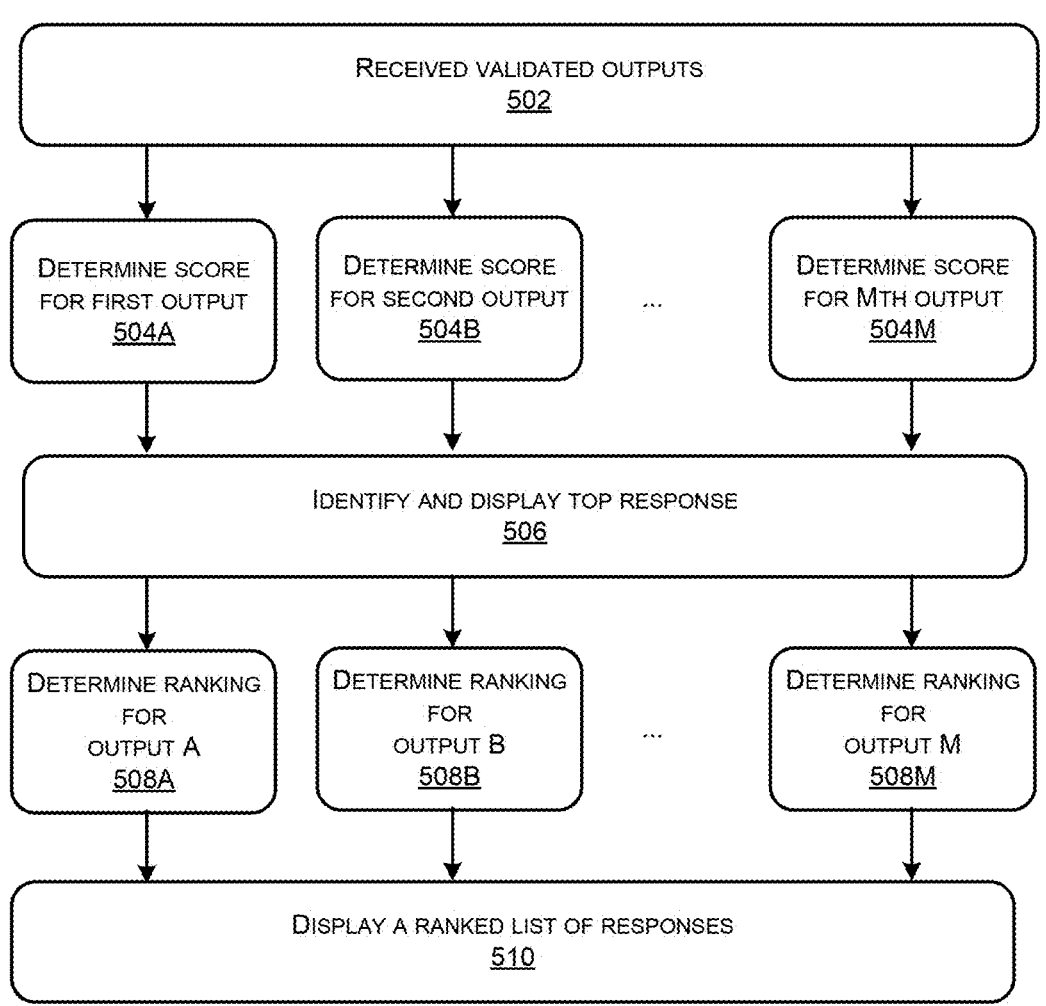

FIG. 5 is a flowchart diagram of an example process 500 for determining and displaying a mitigating response based on a set of validated output texts. As depicted in FIG. 5, at operation 502, an example system (e.g., the XDR system of FIG. 1) receives M validated output texts. The M validated output texts may be the output texts that are generated by a generative machine learning model based on a text prompt and that satisfy a set of output constraints associated with the text prompt.

At operations 504A-504M, the system determines a score for each of the M output texts. For example, at operation 504A, the system determines a score for the first output text; at operation 504B, the system determines a score for the second output text; and at operation 504M, the system determines a score for the Mth output text. The scores may be determined based on quality metrics determined based on word count, length, a predicted metric generated by a machine learning model, presence or absence of one or more data field values, and/or the like. In some cases, the score associated with an mth validated output text from M validated output texts is determined based on the output of $$\sum_{i=1}^{M-1} S(i, m),$$

where S(i,m) is a measure of how much the mitigating response described by an ith one of the remaining M−1 validated output scores confirms the mitigating response described by the mth validated output text.

At operation 506, the system identifies the output text having the highest score and displays the mitigating response described by that output text. The system may designate the mitigating response described by the top-scored output text as the most recommended mitigating response.

At operations 508A-508M, the system determines a ranking for each of the M mitigating responses identified by the M validated output texts. For example, at operation 508A, the system determines a score for the mitigating response described by the first output text; at operation 508B, the system determines a score for the mitigating response described by the second output text; and at operation 508M, the system determines a score for the mitigating response described by the Mth output text. The ranking for an mth mitigating response may be determined based on the score associated with the output text that includes the corresponding mitigating response. For example, if an output text is associated with the pth highest score, then the corresponding mitigating response may have a ranking of p.

At operation 510, the system displays a ranked list of mitigating responses based on the M rankings. In some cases, the system determines a ranked list of the M−1 mitigating response beside the top-scored mitigating response as a set of alternative mitigating responses. The system may display the ranked list to an administrator user using an output user interface, such as using a user interface and/or an API.

Figure 6:
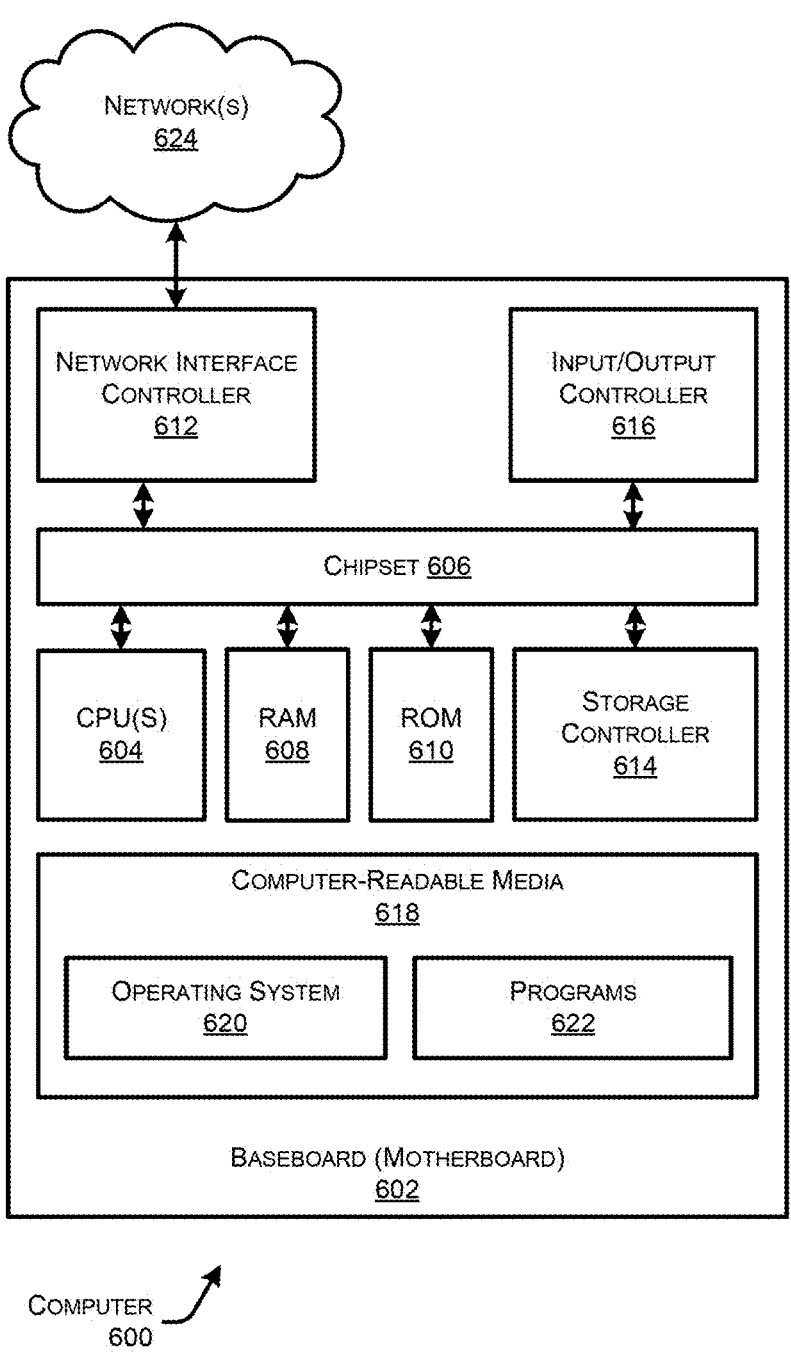
FIG. 6 shows an example computer architecture for a computing device capable of executing program components for implementing the functionality described above.

FIG. 6 shows an example computer architecture for a computing device (or network routing device) 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network 624. The chipset 606 can include functionality for providing network connectivity through a NIC 612, such as a gigabit Ethernet adapter. The NIC 612 is capable of connecting the computing device 600 to other computing devices over the network. It should be appreciated that multiple NICs 612 can be present in the computing device 600, connecting the computer to other types of networks and remote computer systems.

The computing device 600 can be connected to a storage device 618 that provides non-volatile storage for the computing device 600. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by a network, and/or any components included therein (e.g., a router, such as an edge router), may be supported by one or more devices similar to computing device 600. Stated otherwise, some or all of the operations performed by the network, and or any components included therein, may be performed by one or more computing device 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIGS. 1-5. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

The computing device 600 may support a virtualization layer, such as one or more components associated with a computing resource network. The virtualization layer may provide virtual machines or containers that abstract the underlying hardware resources and enable multiple operating systems or applications to run simultaneously on the same physical machine. The virtualization layer may also include components for managing the virtualized resources, such as a hypervisor or virtual machine manager, and may provide network virtualization capabilities, such as virtual switches, routers, or firewalls. By enabling the sharing and efficient utilization of physical resources, virtualization can help reduce costs, simplify management, and increase flexibility in deploying and scaling computing workloads. The computing device 600 may also support other software layers, such as middleware, application frameworks, or databases, that provide additional abstraction and services to application developers and users. In some cases, the computing device 600 may provide a flexible and scalable platform for hosting diverse workloads and applications, from simple web services to complex data analytics and machine learning tasks.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, by a processor, an identifier associated with a security deficiency, wherein the security deficiency is associated with a computer system;

determining, by the processor and based on the identifier, text data associated with the identifier;

determining, by the processor, a text prompt, wherein the text prompt comprises an instruction segment and the text data, and wherein the instruction segment comprises first text data identifying a mitigating response detection task and second text data identifying an output constraint, and wherein the output constraint represents a requirement about a structure of output data generated by a generative machine learning model;

providing, by the processor, the text prompt to the generative machine learning model;

receiving, by the processor and from the generative machine learning model, a set of outputs including a first output identifying a first mitigating response and a second output identifying a second mitigating response;

validating, by the processor, the first output based on determining that the first output satisfies the output constraint;

determining, by the processor, that the second output is invalid based on determining that the second output fails to satisfy the output constraint;

determining, by the processor, and based on validating the first output and determining that the second output is invalid, a final output representing the first mitigating response; and providing, by the processor, the final output using an output interface.

2. The method of claim 1, wherein the mitigating response detection task comprises identifying a compensating control.

3. The method of claim 2, wherein the compensating control is associated with installation of at least one of a monitoring software, a firewall software, or an intrusion detection software on the computer system.

4. The method of claim 2, wherein the compensating control is associated with restricting access to the computer system.

5. The method of claim 1, wherein:

the instruction segment identifies a set of mitigating responses including the first mitigating response and the second mitigating response; and the output constraint is associated with inclusion of a mitigating response from the set of mitigating responses.

6. The method of claim 1, wherein the output constraint is associated with using a text structure.

7. The method of claim 1, wherein determining the text data comprises:

querying an advisory database based on the identifier.

8. The method of claim 1, wherein the text prompt comprises the text data, and wherein the method comprises:

receiving second text data;

determining a second text prompt based on the second text data;

providing the second text prompt to the generative machine learning model;

receiving a second set of outputs including a third output from the generative machine learning model;

determining that the third output satisfies at least one of the output constraint or a second output constraint identified by the second text prompt; and determining the final output based on the first output and the third output.

9. The method of claim 8, wherein determining the final output comprises:

determining a third text prompt that comprises third text data identifying the first output and fourth text data identifying the third output;

providing the third text prompt to the generative machine learning model;

receiving, from the generative machine learning model, a fourth output; and determining the final output based on the fourth output.

10. The method of claim 9, wherein the third text prompt comprises an instruction to combine:

the first output and the second output.

11. The method of claim 1, wherein a similarity associated with the first mitigating response and the second mitigating response exceeds zero.

12. The method of claim 1, wherein the set of outputs comprise a third output identifying a third mitigating response, and the method further comprises:

validating, by the processor, the third output based on determining that the third output satisfies the output constraint;

determining, using a second machine learning model, a similarity score associated with the first output and the third output;

determining a voting score associated with the first output based on the similarity score; and determining the final output based on the voting score.

13. A system comprising:

one or more processors; and one or more computer-readable media storing computer-executable instructions that, when executed by the one or more processors, cause the one or more processors to perform operations comprising:

receiving an identifier associated with a security deficiency, wherein the security deficiency is associated with a computer system;

determining, based on the identifier, text data associated with the identifier;

determining a text prompt, wherein the text prompt comprises an instruction segment and the text data, and wherein the instruction segment comprises first text data identifying a mitigating response detection task and second text data identifying an output constraint, and wherein the output constraint represents a requirement about a structure of output data generated by a generative machine learning model;

providing the text prompt to the generative machine learning model;

receiving, from the generative machine learning model, a set of outputs including a first output identifying a first mitigating response and a second output identifying a second mitigating response;

validating the first output based on determining that the first output satisfies the output constraint;

determining that the second output is invalid based on determining that the second output fails to satisfy the output constraint;

determining, based on validating the first output and determining that the second output is invalid, a final output representing the first mitigating response; and providing the final output using an output interface.

14. The system of claim 13, wherein the mitigating response detection task comprises identifying a compensating control.

15. The system of claim 14, wherein the compensating control is associated with installation of at least one of a monitoring software, a firewall software, or an intrusion detection software on the computer system.

16. The system of claim 14, wherein the compensating control is associated with restricting access to the computer system.

17. The system of claim 13, wherein:

the instruction segment identifies a set of mitigating responses including the first mitigating response and the second mitigating response; and the output constraint is associated with inclusion of a mitigating response from the set of mitigating responses.

18. One or more non-transitory computer-readable media storing computer-executable instructions that, when executed by one or more processors, cause the one or more processors to perform operations comprising:

receiving an identifier associated with a security deficiency, wherein the security deficiency is associated with a computer system;

determining, based on the identifier, text data associated with the identifier;

determining a text prompt, wherein the text prompt comprises an instruction segment and the text data, and wherein the instruction segment comprises first text data identifying a mitigating response detection task and second text data identifying an output constraint, and wherein the output constraint represents a requirement about a structure of output data generated by a generative machine learning model;

providing the text prompt to the generative machine learning model;

receiving, from the generative machine learning model, a set of outputs including a first output identifying a first mitigating response and a second output identifying a second mitigating response;

validating the first output based on determining that the first output satisfies the output constraint;

determining that the second output is invalid based on determining that the second output fails to satisfy the output constraint;

determining, based on validating the first output and determining the second output is invalid, a final output representing the first mitigating response; and providing the final output using an output interface.

19. The one or more non-transitory computer-readable media of claim 18, wherein the mitigating response detection task comprises identifying a compensating control.

20. The one or more non-transitory computer-readable media of claim 19, wherein the compensating control is associated with installation of at least one of a monitoring software, a firewall software, or an intrusion detection software on the computer system.

* * * * *